United States Patent [19]

Simmons

[11] Patent Number: 5,245,271

[45] Date of Patent: Sep. 14, 1993

[54] VOLTAGE REGULATOR AND METHOD

[75] Inventor: Michael C. Simmons, Winter Park, Fla.

[73] Assignee: Transpo Electronics, Inc., Orlando, Fla.

[21] Appl. No.: 586,553

[22] Filed: Sep. 21, 1990

[51] Int. Cl.⁵ .............................................. H02J 7/18
[52] U.S. Cl. .................................... 322/60; 322/58; 322/28; 322/64
[58] Field of Search ...................... 322/60, 64, 58, 28, 322/72, 73, 33, 34

[56] References Cited

U.S. PATENT DOCUMENTS

| | | | |
|---|---|---|---|
| 3,247,443 | 4/1966 | Brayley et al. | 322/28 |
| 3,496,443 | 2/1970 | Snedeker et al. | 322/60 |
| 3,585,490 | 6/1971 | Zelina | 322/28 |
| 3,593,102 | 7/1971 | Kawashima et al. | 322/60 |
| 3,624,481 | 11/1971 | Macharg | 320/39 |
| 3,643,153 | 2/1972 | Hanson et al. | 322/33 |
| 3,663,946 | 5/1972 | Iwaki | 322/23 |
| 3,982,169 | 9/1976 | Cummins | 322/60 |
| 4,409,539 | 10/1983 | Nordbrock et al. | 322/60 |
| 4,517,507 | 5/1985 | Nordbrock et al. | 322/28 |
| 4,525,662 | 6/1985 | Kato et al. | 322/28 |
| 4,831,322 | 5/1989 | Mashino et al. | 322/60 |
| 4,985,670 | 1/1991 | Kaneguki et al. | 322/28 |

FOREIGN PATENT DOCUMENTS 0016569 10/1980 European Pat. Off. .............. 322/60

Primary Examiner—Steven L. Stephan
Assistant Examiner—Ben M. Davidson
Attorney, Agent, or Firm—Allen, Dyer, Doppelt, Franjola & Milbrath

[57] ABSTRACT

A voltage regulator for regulation of automotive electrical generators and battery system. A generator is coupled through a rectifier to a voltage regulator and a battery. The regulator is activated by a low voltage level stator signal from the generator. The activation voltage level is set to an improved initial activation time when the generator starts to charge the battery while maintaining tolerance to rectifier leakage current. A feedback is included in the regulator to lower power dissipation during regulation and protect the regulator during a voltage surge.

10 Claims, 1 Drawing Sheet

VOLTAGE REGULATOR AND METHOD

BACKGROUND OF THE INVENTION

This invention relates to voltage regulators useful in battery charging system applications, and more particularly relates to techniques for regulating voltage in an automotive charging system.

In general, automotive charging systems include an alternating current generator, generally referred to as an alternator, that is operated by the engine from a drive belt and supplies a charging current to a voltage regulator, and a battery current and a constant output voltage to a battery and an automobile's electrical system. As the engine runs, the belt rotates causing the alternator through its stationary or stator windings to supply the charging current to the voltage regulator. The voltage regulator then regulates the alternators output voltage.

An alternator usually has a three-phase winding on the stationary or stator pole. A typical automotive alternator is composed of a shaft-mounted rotating field winding that is supplied field current. The field winding is wound on an inter-digitated pole. The inter-digitated pole is situated within a stationary pole. This stationary pole has multiple slots for receiving the stationary windings. An electric excitation current is applied as a feedback from the battery across the field winding. Rotating the inter-digitated pole as excitation current is applied across the field winding produces an alternating current in the windings of the stationary pole. This alternating current is then applied as a charging current to the input of the voltage regulator, and is applied through a three-phase bridge-rectifier as a battery current to the battery.

Conventional alternators employ a field winding, and to operate in the intended manner, require an external excitation current to the field winding. In the prior art, it is known to provide an excitation current to the alternator's field winding as a feedback current from the voltage regulator in response to changes in charging and current demands of the automobile's battery and electrical system. The alternator, in turn, responds to the excitation current across its field winding by increasing and decreasing the output charging current relative to the excitation current.

In operation, the magnitude of the direct current generated is dependent primarily on the field excitation current and the shaft's rotational velocity. To compensate for load demands and rotational accelerations, the electrical system voltage regulator modifies the field excitation current to maintain the alternator's output voltage at a constant level.

These basic fundamentals are integral to the operation of all prevalent systems in application. Primary differences which distinguish the various types of systems found in the industry relate directly to the field excitation source and activation thereof.

At low shaft rotational velocities there is a point in the operating characteristic of an alternator where it is not capable of producing battery current. This rotational velocity point is generally referred to as the cut-in rotational velocity. If excitation is supplied by the battery when the shaft's rotational velocity is lower than cut-in, unnecessary current drain will result.

As is known, this problem is readily solved by providing an excitation current from the alternator's stationary windings through a second set of three-phase bridge-rectifiers. In the simplest form the rectifiers are rated for the excitation current only. Below the cut-in rotational velocity the second set of bridge-rectifiers starves the stationary windings but reverse biases the first set of bridge-rectifiers resulting in no current drain to the battery. This ideal, self-excited technique relies heavily on residual magnetism in the rotor poles for activation. Hence, the alternator's cut-in rotational velocity is related to the rotor material's permeability and excitation current. Also, rotational velocity at which the stationary windings provide sufficient charging current for detection of shaft rotating, i.e. activation rotational velocity is related to the rotor material's coercive force. In order to allow the cut-in rotational velocity and the activation rotational velocity to coincide, stringent constraints must be imposed upon the rotor material's magnetic properties.

To overcome these constraints, the industry has evolved techniques employing electronic circuits to circumvent alternator performance limitations in regards to activation and excitation. These techniques allow more freedom to improve operational performance characteristics, and include coupling a current sensing resistor to a stationary winding and the base of a silicon transistor. The transistor's collector then enables the voltage regulation circuitry to excite the alternator.

A drawback to this technique is that silicon transistors have typically a base emitter turn on voltage above 0.7 V. Consequently, the voltage regulation current does not activate the alternator until the alternator's shaft rotational velocity reaches 2,800 revolutions per minute. This delayed activation may result in increased battery drain.

Voltage regulators typically drive the field winding using power transistors that have limitations of three to eight amps of current. During operation these power transistors are switched on and off by sensing the field winding current and stationary winding current to regulate the battery voltage. Voltage regulators typically employ a feedback circuit to sense the current being fed through the field winding. This feedback circuit is necessary to assure that the power transistor transitions from an "off" state to an "on" state.

When the power transistor switches from an "off" to an "on" state using feedback circuitry, it may gradually cycle through a transition state. In this transition state, the power transistor tends to increase its power dissipation. This increase of power dissipation, in addition to wasting energy, may increase the operating temperature of the power transistor thereby decreasing the power transistor's life expectancy.

During operation of the alternator, surges in the voltage level occur across the voltage regulator. During these high voltage surges, generally referred to as a load dump condition, the power transistor may be switched "on." This may result in the voltage between the collector and emitter of the power transistor exceeding its operating parameters resulting in destruction of the power transistor and other voltage regulator components.

Voltage regulators are subjected to wide variations of temperature during operation. Operating characteristics of the voltage regulator's electrical components change with temperature variations. For the voltage regulator to maintain a constant level output, temperature compensating components, such as thermistors, must be included in the voltage regulator circuitry. However, thermistors are expensive as additional supporting electronics must be incorporated into the voltage regulator circuitry.

SUMMARY OF THE INVENTION

An object of this invention is to produce a voltage regulator capable of activating an alternator at a rotational velocity of the alternator's shaft which does not exceed the alternator cut-in rotational velocity by a significant ratio.

Another object of this invention is to reduce the battery current drain requirements for all operation modes and conditions within which the alternator and the associated charging system must operate.

A further object of this invention is to produce a voltage regulator capable of improved regulation and stability performance that does not depend on the characteristics of an alternator for improved performance.

It is also an object of this invention to incorporate advanced components and design techniques to further enhance the performance characteristics of the regulator by obtaining an optimum circuit realization.

An additional object of this invention is to produce a regulator device with extended reliability.

An object of this invention is to provide an improved regulator device with compatible retrofit function and form-facto equivalence or a retrofit device which reduces the overall parts count of the system into which the retrofit is incorporated.

A further object of this invention is to provide a feedback circuit with a power transistor that activates current in the alternator field winding such that the power transistor quickly transitions from "off" to "on."

Another object of this invention is to drive the field winding of an alternator with a power transistor that does not saturate in a voltage surge condition.

An additional object of this invention is to provide a voltage regulator that includes a reduced number of electronic components to compensate for temperature variation.

These and other objects are provided by incorporating an activation detector and regulator circuit stages in cascade to accomplish both alternator field winding activation and battery regulation functions. The activation detector input is either connected to a single phase of the alternator's stationary winding for a minimum implementation or to a three-phase bridge-rectifier output for normal retrofit implementation. This signal on the detector's input is amplified and filtered in order to activate the regulator stage. The regulator stage supplies the field excitation current with a single connection to battery. The excitation circuit path is also completed with a power transistor that is coupled to the field winding and the battery.

Also provided is an apparatus for regulating voltage to a battery from an automotive alternator having a stator or stationary winding and a field winding, the stator winding having a terminal with a voltage potential with respect to one of the terminals of the battery, the apparatus comprising means for detecting when the voltage potential has a level that is below 0.7 volts and is preferably between about 0.2 and 0.6 volts. The apparatus also provides a voltage detect output signal when the voltage potential level is detected and means for applying an excitation current across the field winding sufficient to activate the generator's response to the voltage detect output. By detecting levels below 0.7 volts the field winding of the voltage regulator will be activated at lower shaft rotational velocities.

An apparatus is also provided that is adapted to regulate a battery voltage level and a ripple voltage level provided from an automotive generator to a battery. The generator has a stationary winding and a field winding. The generator increases a charging current from the stationary winding in response to an excitation current being increased across the field winding. The apparatus comprises means for providing a first signal indicating charging current is being provided from the stationary winding. The device also includes switch means for increasing the excitation current flow across the field winding, and means responsive to the first signal for enabling the switch means. The enabling means includes feedback means isolated from the field winding for sensing the ripple voltage level being provided to the battery, such that the excitation current is increased when the ripple voltage level is above a predetermined level and the excitation current is decreased when the ripple voltage level is below the predetermined level. By isolating the feedback means from the field winding the circuit is more resistive to voltage surges. Further, the switch means more quickly responds to changes in the battery voltage.

An apparatus is also provided to regulate voltage across terminals of a battery derived from charging current provided from a generator having a field winding. The apparatus comprises switch means for sourcing excitation current from the field winding and means for providing a voltage detect signal indicating charging current is being generated by the generator. The apparatus further includes means responsive to the voltage detect signal for providing a reference voltage level and means responsive to the reference voltage level comprising a Darlington transistor circuit for enabling the switch means. The apparatus also includes means having a Zener diode coupled to the Darlington transistor circuit for maintaining the voltage level to which the enabling means responds. Accordingly, the Zener diode enables the switch means to compensate for changes in ambient air temperature by changing the Zener diode's operating characteristics in a given temperature to offset any change in operating characteristics of the Darlington transistor circuit.

DESCRIPTION OF THE PREFERRED EMBODIMENTS

Figure 1:
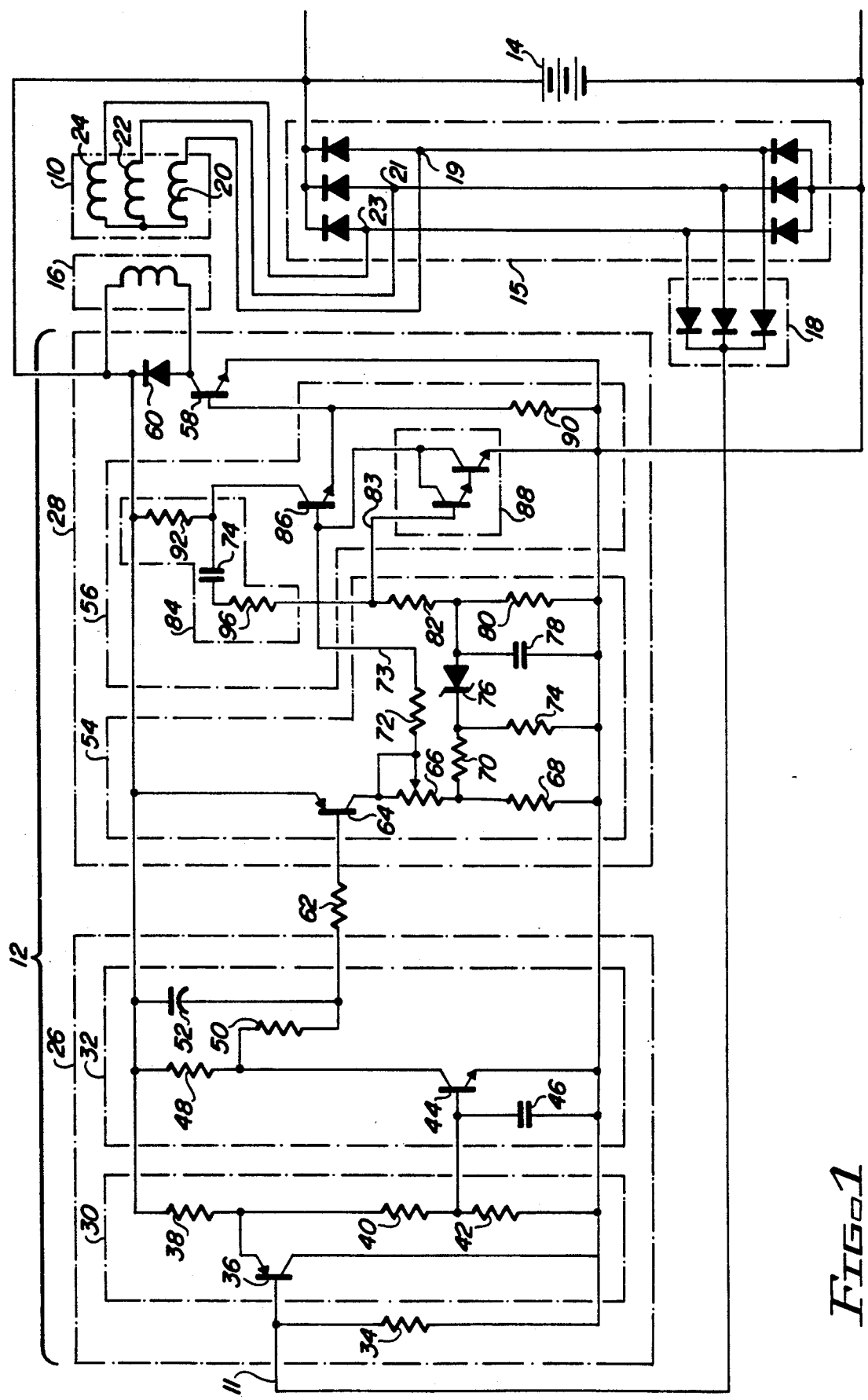
FIG. 1, is a schematic diagram of an automotive charging system incorporating the voltage regulator of the present invention.

Referring to FIG. i there is shown generator 10, voltage regulator 12, battery 14, three-phase bridge-rectifier 15 and diode module 18. Generator 10 provides current to voltage regulator 12, to battery 14 and field winding 16 within generator 10. Battery 14 has a positive terminal and a negative terminal. Generator 10 supplies current to terminal 11 of voltage regulator 12 through diode module 18. Battery current is supplied to battery 14 through three-phase bridge-rectifier 15.

Generator 10 includes stationary windings 20, 22 and 24, generally referred to as stator windings. Charging current is supplied through generator stator windings 20, 22 and 24 and diode module 18 to voltage regulator 12. Although voltage regulator 12 is shown coupled through three diodes within diode module 18, voltage regulator 12 may be easily modified, as will be discussed later, to eliminate diode module 18 to allow only one of the stationary windings to be coupled to voltage regulator 12.

Voltage regulator 12 includes detection circuitry 26 for detecting current from generator 10. Voltage regulator 12 also includes voltage regulator circuitry 28 for regulating voltage to battery 14 and for sourcing currents across field winding 16.

Current detection circuitry 26 includes voltage detect circuitry 30 and circuitry 32 to provide a voltage detect signal to voltage regulator circuitry 28. Current detection circuitry 26 also includes resistor 34 that regulates the voltage level being fed to detect circuitry 30 in response to current from generator 10.

Detect circuitry 30 includes a transistor 36 having its base terminal coupled to resistor 34, its collector terminal coupled to ground and its emitter terminal coupled to the junction of resistors 38 and 40. Resistor 40 is coupled to the junction of resistor 42 and circuitry 32. Resistor 38 is coupled to battery 14.

Circuitry 32 includes a transistor 44 having its base terminal coupled to voltage detector 30 and through capacitor 46 to the negative terminal of battery 14. The collector terminal of transistor 44 is coupled through resistor 48 to positive terminal of battery 14, and is also coupled to voltage regulator circuitry 28. The emitter terminal of transistor 44 is coupled to the negative terminal of battery 14.

Alternately, circuitry 32 may include a resistor 50 that is coupled between the junction of transistor 44 and resistor 48, and resistor 62. When resistor 50 is included, a capacitor 52 is connected between the junction of resistors 50 and 62. Capacitor 52 is coupled to the positive terminal of battery 14. Resistor 50 and capacitor 52 are only used when voltage regulator 12 is coupled to one terminal of the stationary windings 20, 22 or 24 within generator 10 without diode module 18 being present.

Voltage regulator circuitry 28 includes a reference voltage level circuit 54 coupled through detection circuit 56 to enable and disable switch transistor 58. Switch transistor 58 is also referred to as a power transistor. The collector terminal of switch transistor 58 is coupled through diode 60 to the positive terminal of battery 14 and is also coupled to field winding 16. Switch transistor 58, when enabled, increases excitation current flow through field winding 16. Switch transistor 58, when disabled, reduces excitation current through field winding 16.

Reference voltage level circuit 54 includes a resistor 62 that couples current detection circuitry 26 to the base terminal of transistor 64. The emitter terminal of transistor 64 is coupled to positive terminal of battery 14 and the collector terminal of transistor 64 is coupled through variable resistor 66 and resistor 68 to ground. The collector of transistor 64 is also coupled through resistor 72 to provide an error voltage level on line 73 to detection circuit 56. This error voltage is related to the excitation current. Further, a ripple voltage on the positive terminal of battery 14 propagates through transistor 64 to line 73.

The junction of variable resistor 66 and resistor 68 is coupled to resistor 70. Resistor 70 is coupled through resistor 74 to the negative terminal of battery 14. The junction of resistor 74 and resistor 70 are coupled to the cathode of Zener diode 76. Zener diode 76 is a temperature compensating diode, the details of which will be explained later. The anode of diode 76 is coupled to capacitor 78, resistor 80 and resistor 82. Capacitor 78 and resistor 80 are terminated in the negative terminal of battery 14. Resistor 82 is coupled to detection circuit 56 and provides a reference voltage level on line 83. The reference voltage level is set by the values of resistors 66, 68 and 70.

Detection circuit 56 couples circuit 54 to switch enable transistor 58, battery 14, and field winding 16. Detection circuit 56 includes feedback circuit 84, Darlington transistor circuit 88 and switch enable transistor 86. The base terminal of switch enable transistor 86 is coupled to resistor 72 in reference voltage level circuit 54 and the collector of Darlington transistor circuit 88. The emitter terminal of Darlington transistor circuit 88 is terminated in the negative terminal of battery 14. The base terminal of Darlington transistor circuit 88 is normally biased by the reference voltage level on line 83. The emitter terminal of switch enable transistor 86 is coupled through resistor 90 to the negative terminal of battery 14. Transistor 86 enables and disables switch transistor 58 in response to changes of the error voltage level on line 73. Further, transistor 86 through Darlington transistor circuit 88 responds to changes in the reference voltage level and responds to the ripple voltage level on line 73.

Feedback circuit 84 includes resistor 92 coupled in series through capacitor 94 and resistor 96 to the base of Darlington transistor circuit 88. Resistor 92 is coupled between the collector terminal of switch enable transistor 86 and the positive terminal of battery 14. Feedback circuit 84 is coupled to the collector of switch enable transistor 86. Reference voltage level circuit 54 provides a voltage level above Darlington transistor circuit 88 base terminal activation region to enable Darlington transistor circuit 88 when the voltage level on the positive terminal of battery 14 exceeds a predetermined level. When the voltage level on the positive terminal of battery 14 drops below a predetermined level, reference voltage level circuit 54 provides a voltage level below cut-off of Darlington transistor circuit 88. This voltage level below cut-off lowers the reference voltage level on line 83 to disable Darlington transistor circuit 88.

The error voltage level on line 73, when, the voltage detect signal is present from current detect circuit 26, enables switch enable transistor 86. However, when Darlington transistor circuit 88 is enabled, such as in a voltage surge, Darlington transistor circuit 88 clamps the voltage level on line 73 to the voltage level on the negative terminal of battery 14. When the voltage level on line 83 is clamped, the voltage level on switch enable transistor 86 base terminal drops below cut-off. When the base terminal of switch enable transistor 86 voltage drops below cut-off, switch enable transistor 86 feeds voltage level below cut-off of the base terminal of switch transistor 58 to disable switch transistor 58 thereby reducing current through field winding 16. It is recognized by the inventor that during a voltage surge switch enable transistor 86 is disabled to prevent a high voltage level from destroying transistor 86 and switch transistor 58.

When the voltage potential across the terminals of battery 14 falls below a predetermined threshold, feedback circuit 84 reinforces a low voltage signal to line 83 below Darlington transistor circuit 88 cut-off. Darlington transistor circuit 88 responds to this low voltage signal by releasing line 73, i.e. no longer clamping line 73, thereby allowing the voltage level of line 73 to increase to a voltage level above switch enable transistor 86 cut-off. Switch enable transistor 86 becomes enabled in response to line 73 being released. Switch enable transistor 86 then provides an enable signal having a voltage level above the active region of switch transistor 58 to the base terminal of switch transistor 58. Switch transistor 58 responds to the enable signal on its base terminal quickly progressing through its transition region by increasing the excitation current through field winding 16. Power dissipation is reduced during switch transistor 58 operation when the signal on the base terminal of switch transition 58 progresses quickly through its transition region.

During operation, standby mode is obtained when the shaft's rotational velocity of the alternator is zero. In stand-by mode the alternator is not capable of producing any current; therefore, field excitation current is not necessary. The function of the detector circuitry 26 is to evaluate the stator-signal provided at terminal 11 and activate or deactivate voltage regulator 12 accordingly.

Voltage is present at positive terminal of battery 14 in the stand-by mode. This voltage provides a stand-by bias current to the emitter terminal of transistor 36 via resistor 38. The base of transistor 36 bias current is summed with the current on terminal 11 thereby producing a direct current (DC) offset potential at the base of transistor 36. This offset voltage is increased by a single base-emitter drop at the emitter of transistor 36. The increased offset voltage is then attenuated by resistors 40 and 42 producing a DC potential lower than the base-emitter threshold potential of transistor 44. Capacitor 46 reduces the overall detectors' response to impulse noise allowing an increase in the stand-by mode stability factor. When transistor 44 is in cut-off, resistor 48 sums the leakage currents of transistor 44 and the collector-base leakage current of transistor 64 producing an offset voltage. This offset voltage is increased by transistor 64 collector-base leakage current multiplied by the value of resistor 62. This increased offset voltage is less than transistor 64 base-emitter threshold potential, thus keeping transistor 64 in cut-off.

Variable resistor 66 and resistors 68, 70 and 74 sum the leakage currents of transistor 64 and the collector-base leakage currents of switch enable transistor 86 to produce an offset voltage. This offset voltage is increased by switch enable transistor 86 collector-base leakage current multiplied by the value of resistor 72. This increased offset voltage produces a potential which is lower than switch enable transistor 86 base-emitter threshold keeping switch enable transistor 86 in cut-off. This increased offset voltage also allows resistor 90 to sum switch enable transistor 86 collector emitter leakage current with switch transistor 58 collector-base leakage current to produce an offset voltage less than the base-emitter threshold potential of switch transistor 58 to keep switch transistor 58 in cut-off. The overall stand-by drain of this circuit is the sum of resistor 38 bias current and the combined leakage currents of transistors 44, 64, 58 and 86.

When the shaft of generator 10 rotational velocity is increased sufficiently, residual magnetism in the rotor core of said generator 10 induces a low-level alternating voltage in stationary windings 20, 22 and 24 great enough to overcome the combined forward-biased diode drops of the diode module 18 and the negative rectifiers of three-phase bridge-rectifiers 15. As current begins to flow into resistor 34, the non-linear impedances of resistor 34 interacts with both resistor 34 and the series impedance of the stationary windings 20, 22 and 24. This interaction produces an exponentially increasing current through resistor 34 for increasing the shaft's rotational velocity.

A threshold voltage Vt is found at terminal 11 and obeys the relationship of:

$$\ln V_t = \ln K + M \ln \text{ (the value of Resistor 34)}$$

where K and M are constants, the value of resistor 34 is greater than zero, and the series winding impedance of stationary windings 20, 22 and 24 is negligible. This voltage (Vt) is summed with the offset voltage on resistor 34 and increased by one base-emitter drop at the emitter of transistor 36.

Resistor 34 is selected so that when the shaft's rotational velocity in generator 10 exceeds the cut-in rotational velocity, the voltage level on terminal 11 is sealed above the cut-off voltage level of transistor 44. Thus, when the voltage level on terminal 11 exceeds the selected activation voltage, voltage regulator 12 activates field winding 16. Preferably, this activation voltage is set between 0.2 and 0.6 volts.

The attenuation of resistors 40 and 42 is selected to provide a voltage equal to the base-emitter threshold potential of transistor 44 which is subsequently biased into its active region. Transistor 44 collector current is sensed by resistor 48. Voltage potential across resistor 48 exceeds transistor 64 base-emitter threshold potential allowing transistor 64 to saturate and activate voltage regulator circuitry 28.

It is clearly evident that the ability of this circuit configuration to withstand leakage currents from the alternator rectifiers is equal to Vt divided by the resistance of resistor 34 in the standby mode. This leakage current tolerance is allowed to be on the order of one milliampere. Resistor 34 may therefore be chosen to optimize the stand-by current tolerance while reducing the alternator shaft rotational velocity necessary to provide shaft rotation detection. The lowest value possible for resistor 34 is limited by its fully activated on-state dissipation.

This concludes the description of the preferred embodiments. A reading by those skilled in the art will bring to mind various changes without departing from the spirit and scope of the invention. It is intended, however, that the invention only be limited by the following appended claims.

What is claimed is:

1. A voltage regulator for charging a battery having a positive terminal and a negative terminal and a voltage potential between said terminals, the regulator being adapted to be coupled to a generator being adapted to supply charging current from said stator winding in response to an excitation current being fed to said field winding, the votlage regulator comprising:
   means for providing a signal indicting that charging current is being provided from said stator winding;
   means for receiving said signal and for providing an error voltage and for providing a reference voltage responsive thereto;
   means having a first transistor for controlling an excitation current flow through the field winding;
   means having a second transistor responsive to changes in the level of said error voltage and said signal for biasing said first transistor;
   feedback means coupled to said second transistor for sensing changes ni the level of said error voltage and for changing the level of said reference voltage in accordance with the sensed changes; and means reponsive to said feedback means and the level of said refernce voltage for changing the bias of said second transistor.

2. The apparatus as recited in claim 1, further comprising means for changing the bias voltage of said second transistor to disable said second transistor when said voltage potential between said terminals of said battery exceeds a predetermined value.

3. The apparatus recited in claim 1, further comprising:
  means for detecting when a voltage between the stator winding and one of the terminals of the battery has a level that is substantially below 0.7 volts, and for providing a voltage detect output responsive thereto; and
  means for applying an excitation current across said field winding sufficient to activate said generator in response to said votlage detect output.

4. The apparatus recited in claim 3, wherein said detecting means provides a voltage detect output when said stator-battery terminal voltage level is between about 0.2 and 0.6 volts.

5. The apparatus recited in claim 3 wehrein said detecting means comprises:
  a resistor coupled between said stator winding and ground;
  a third transistor adapted to be biased by the voltage across said resistor; and
  a fourth transistor biased by said third trnasistor such that the voltage detect output is provided when current flow through said fourth transistor.

6. The apparatus recited in claim 5 wherein said thrid transistor has an emitter terminal; and wherein said fourth transistor has a base terminal that is biased by the emitter of said first transistor.

7. The appartus recited in claim 1, wherein said signal providing means comprises a resistor coupled to said stator winding such that when a charging current is fed from said stator winding, a voltage drop occurs across said resistor.

8. The apparatus recited in claim 1 wherein said second transistor bias changing means comprises a Darlington transistor circuit.

9. The apparatus recited in claim 8 further comprising means coupled to said Darlington transistor circuit and including a Zener diode for compensating in changes in ambient air temperature.

10. The apparatus recited in claim 8 wherein said feedback means is coupled to said Darlington circuit.

* * * * *